United States Patent [19]

Goettker

[11] Patent Number: 5,054,859
[45] Date of Patent: Oct. 8, 1991

[54] GREASE PRESSURIZING HUBCAP FOR A WHEEL HUB

[75] Inventor: Bernhardt P. Goettker, Escondido, Calif.

[73] Assignee: Unique Functional Products, San Marcos, Calif.

[21] Appl. No.: 594,568

[22] Filed: Oct. 9, 1990

[51] Int. Cl.⁵ .................... F16C 1/24; B60B 27/00
[52] U.S. Cl. .................... 301/108 R; 301/108 TW; 184/45.1
[58] Field of Search ............ 301/37 R, 108 R, 108 A, 301/108 SC, 108 S, 108 TW; 184/45.1, 6.25

[56] References Cited

U.S. PATENT DOCUMENTS

| | | |
|---|---|---|
| 1,454,922 | 5/1923 | Fesler . |
| 1,676,457 | 7/1928 | Murphy . |
| 1,818,347 | 8/1931 | Murphy . |
| 1,880,854 | 10/1932 | Davis . |
| 2,011,616 | 8/1935 | Clarke . |
| 2,254,502 | 9/1941 | Thomas . |
| 3,077,948 | 2/1963 | Law . |
| 3,649,080 | 3/1972 | Molinare ................ 301/108 R |
| 3,785,706 | 1/1974 | Vangalis ................ 301/108 A |
| 3,955,852 | 5/1976 | De Puydt ............... 301/108 R |
| 4,058,185 | 11/1977 | Ploeger ................. 184/1 D |
| 4,106,816 | 8/1978 | August .................. 301/108 R |
| 4,113,061 | 9/1978 | Peaster ................. 184/41 |
| 4,190,133 | 2/1980 | Ploeger ................. 184/1 D |
| 4,941,550 | 7/1990 | Blake ................... 184/45.1 X |

OTHER PUBLICATIONS

Red Eye Bearing Watch Information Sheet, Red Eye, Inc., no date.
Bearing Buddy Information Pamphlet, Unique Functional Products, no date.

Primary Examiner—Russell D. Stormer
Attorney, Agent, or Firm—Duane C. Bowen

[57] ABSTRACT

A grease pressurizing hubcap for a wheel hub including a barrel press fit in the hub. A plastic piston disposed in the barrel and movable between inner and outer annular abutments in the barrel, the outer abutment being formed by an inward turned, reverse bent flange and the inner abutment being formed by a polygon-shaped split ring set in an annular groove in the interior of the barrel. A compression spring acting between the piston and the outer annular abutment normally pressing the piston to an inner position. A lubricating fitting set in the piston to fill the barrel on the inner side of the piston and to act against the compression spring to pressurize grease in the hub. A colored annular outer flange on the piston withdrawn into the barrel in the absence of pressurized grease and extending outwardly from the barrel in the presence of pressurized grease to visually indicate the grease pressure level conditions in the hub. A plurality of pressure relief openings through the piston and a spring disc covering the pressure relief openings and held in place by the lubricating fitting, the disc permitting escape of grease through the openings in overpressurization conditions. A dust cap is fitted on the outer end of the piston.

11 Claims, 2 Drawing Sheets

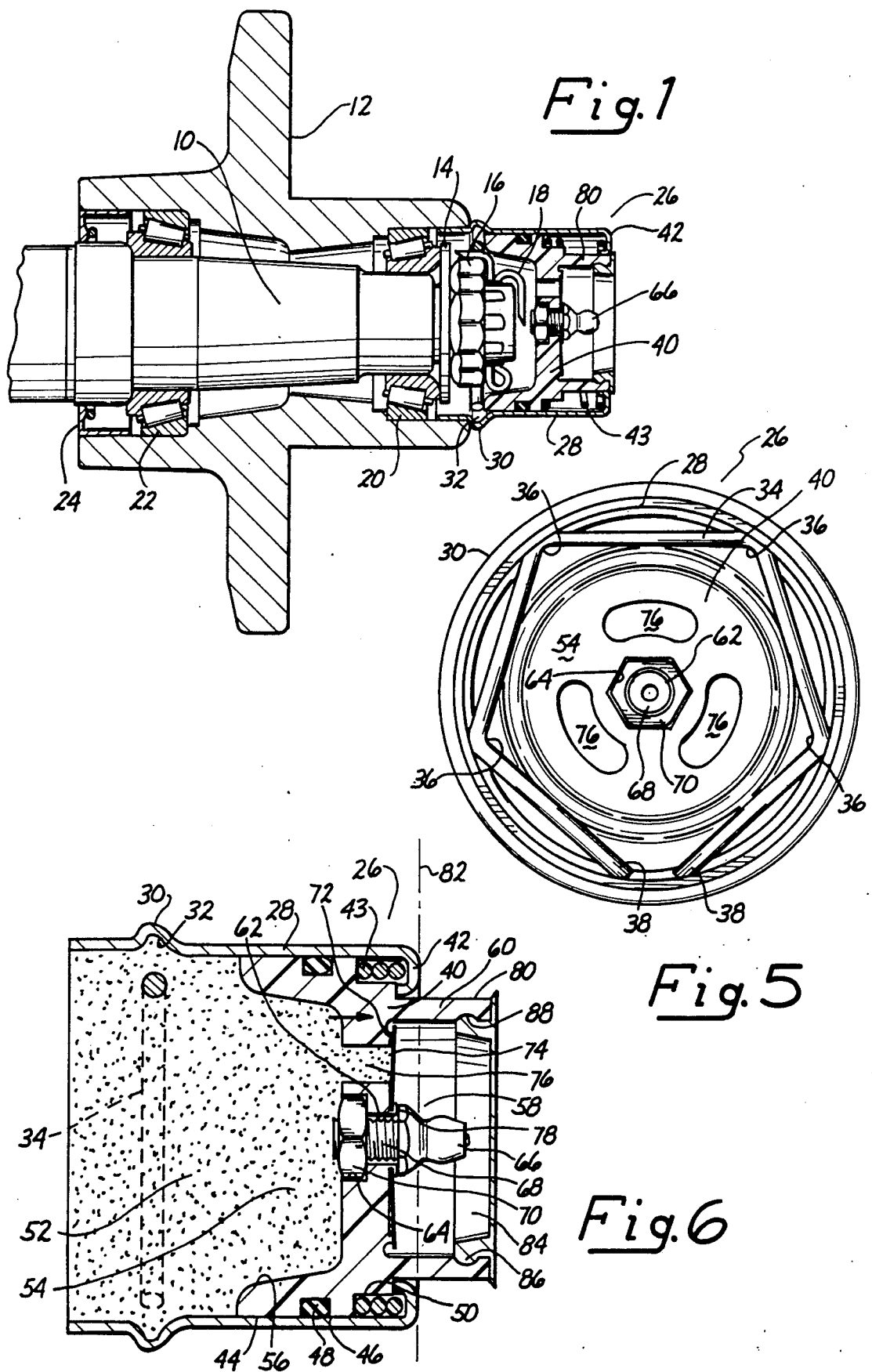

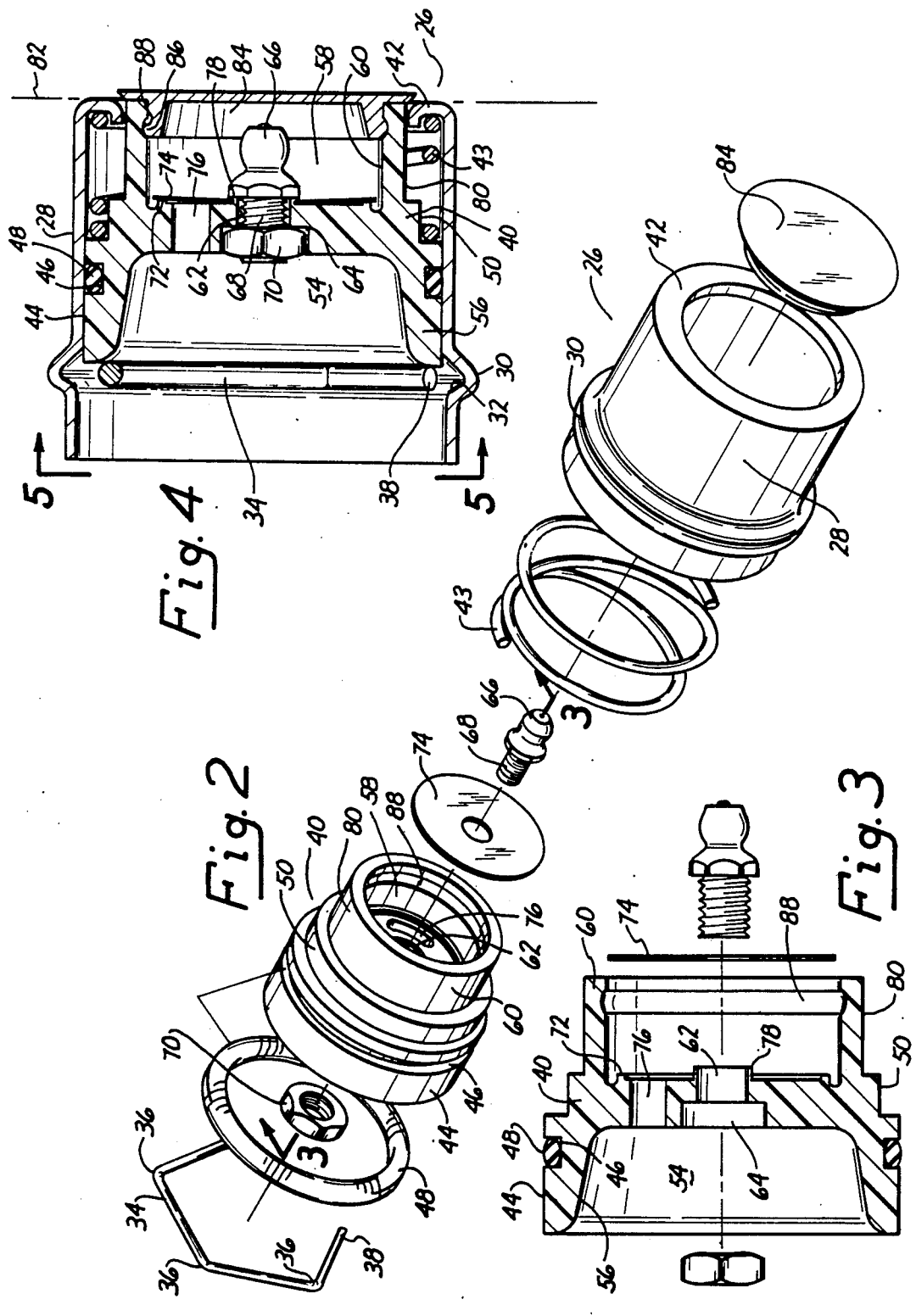

GREASE PRESSURIZING HUBCAP FOR A WHEEL HUB

BRIEF SUMMARY OF THE INVENTION

BACKGROUND AND OBJECTIVES

My invention concerns a hubcap for a wheel hub in which pressurized grease is applied to the hub. Such a hubcap is used especially in boat trailers in which the hubcap retains grease and blocks water flow into wheel bearings.

It is well established in the case of a boat trailer that bearings are at peril when the trailer is backed down a ramp into water to launch and retrieve a boat. When a boat trailer has been towed for some time, the trailer wheel hub, spindle and bearing assemblies frequently attain high temperatures. When the boat trailer is backed into cold water for boat removal, the hub assembly is cooled, contracting the air and lubricant within the hubcap and around the bearing assemblies, creating a partial vacuum which leads to water entry into the area of the bearings, along with sand, dirt, and other contaminants. This eventually causes rust, corrosion, and fouling of wheel bearings, creating a serious problem for continued use of the trailer. The pioneer patent on this subject is U.S. Pat. No. 3,077,948, dated 2/19/63, entitled "Hubcap Apparatus", and awarded to Denny B. Law.

Hubcaps pressurizing grease are valuable not only with boat trailers but also with some other types of vehicles especially with utility, camping, motorcycle, snowmobile, and horse trailers and with occasional use trailers in general. Bearing corrosion and failure can be caused from moisture condensing from air sucked into hot hubs as they cool. Moisture stays in the hubs causing rust and pitting. Without proper lubrication, hubs, etc., on all types of trailers can overheat causing bearing damage. Hubs and spindles usually are damaged along with the bearings. Bearing failures on the road can lead to serious accidents. Hubs subjected to salt water, of course, will corrode faster than hubs subjected to fresh water.

One of the problems with such a hubcap is for the boat trailer owner to conveniently and effectively detect when there is no longer a supply of pressurized grease applied to the trailer wheel bearings. An associated problem is to provide for effective relief of pressure when the hubcap and bearings become overpressurized. When the hubcap is being filled with grease from a hand powered grease gun, it is important not only that overpressurization be relieved but also that this overpressurization condition be readily detected so that a minimum amount of grease, if any, will be expelled from the hubcap area subject to overpressurization. Objectives of my invention include to provide convenient and effective visual detection when pressurized grease has been depleted; to provide for effective relief of pressure upon overpressurization; and to provide for ready detection when overpressurization occurs during filling of the hubcap with a hand powered grease gun. It is a further objective of my invention to deposit grease expelled from the hubcap pressurized area into an external cavity and to seal the external cavity with a cap during trailer use so that excess grease will not be thrown out of the external cavity by centrifugal force onto trailer wheels.

Further objectives include: to devise a hubcap structure made at least partly of metal but avoiding galvanic action between dissimilar metals; to provide a high quality, effective and durable construction; to devise an economical construction to the extent possible without being injurious to quality of the product.

My invention will be best understood, together with additional objectives and advantages thereof, from the following description, read with reference to the drawings, in which:

THE DRAWINGS

FIG. 1 is a view of vehicle hub structure, primarily in cross-section, showing a specific embodiment of my invention.

FIG. 2 is a perspective view of the parts of my invention, shown in exploded form.

FIG. 3 is a view, primarily in cross-section, of certain parts in exploded positions.

FIG. 4 is a view primarily in cross-section with the piston shown in an inner position signifying absence of grease pressure.

FIG. 5 is a view of the hubcap from the inner end, taken on line 5—5 of FIG. 4.

FIG. 6 is a view like FIG. 4 but with the piston shown in an outer position signifying the hubcap is fully pressurized with grease.

SPECIFIC DESCRIPTION

The general conventional structure to which my invention applies includes hub spindle 10, wheel hub 12, spindle washer 14, spindle nut and retainer 16, cotter pin 18, outer bearing 20, inner bearing 22, and inner seal 24.

Hubcap 26 includes a generally cylindrical stainless steel barrel 28 open at inner and outer ends. When the expression "inner" and "outer" is used in the specification and claims, "inner" means inward of the hub in the direction of the axis of hub spindle 10 and "outer" means outward of the hub in the direction of the axis of hub spindle 10, in the same sense that bearing 22 is "inner" and bearing 20 is "outer".

The inner end of barrel 28 is press fit into wheel hub 12. The exterior diameter of barrel 28 preferably is somewhat larger than the hub's interior diameter. Perhaps 80% of trailer wheel hubs have the same diameter. In fitting other trailer wheel hubs, an adapter ring can be used as will be understood by those skilled in the art. Barrel 28 is annularly formed near its inner end to form an external annular rib 30 limiting entry of hubcap 26 into hub 12 and forming an inner annular groove 32. A stainless steel wire split ring 34 is disposed in annular groove 32 to form an inner limiting abutment for travel of piston 40. Split ring 34 has a pentagon configuration with four bends 36 and two ends 38 lodged in annular groove 32. This configuration of split ring 34 makes an effective abutment both from the standpoint of lodgment in annular groove 32 and from the standpoint of areas contacting piston 40 when they abut. Instead of a pentagonal configuration, a different polygonal configuration could be used, such as octagonal or hexagonal.

Barrel 28 has an outer abutment 42 at its outer end by an inturned, reverse bend internal flange, Outer abutment 42 is adapted to receive one end of a stainless steel, compression coil spring 43 that acts between outer abutment 42 and piston 40, to normally bias piston 40 to an inner position.

A molded plastic piston 40 is disposed in barrel 28 and is limited in inward movement by the inner abutment formed by split ring 34. Piston 40 has a full diameter portion 44 slidable axially of barrel 28. Full diameter portion 44 has an annular groove 46 receiving an 0-ring 48 which bears on the interior of barrel 28 to seal against escape of pressurized grease between piston 40 and barrel 28.

Piston 40 has a reduced diameter outer end portion 50 in which compression coil spring 43 is disposed. Spring 43 acts between piston 40 and outer abutment 42 to normally press piston 40 toward an inner position, toward inner abutment 34, to pressurize grease 52 at the inner side of piston 40.

Piston 40 preferably is formed with an inner central cavity 54 at the inner side of piston 40 formed by an inner annular flange 56. Cavity 54 provides room for extra grease. The length of annular flange 56 in a direction parallel to the axis of hub spindle 10 helps stabilize piston 40 against any tendency piston 40 might have to tip and wedge in barrel 28 if the effective axial length of piston 40 were shorter.

Piston 40 has an outer central cavity 58 formed by an outer annular flange 60 of diameter close to the inside diameter of barrel internal annular flange 42. Outer cavity 58 forms a receptacle to receive grease in over-pressurization conditions.

Piston 40 has a central bore 62 and has a hexagonal recess 64 at the inner end of bore 62. A zinc plated steel lubricating fitting 66 is disposed centrally in outer cavity 58 and has a threaded shank 68 disposed in bore 62. A zinc plated steel hexagonal nut 70 is disposed in recess 64 and is threadedly engaged with shank 68. Grease under pressure from a hand powered lubricating gun can be applied through lubricating fitting 66 to fill wheel hub 12 and to press piston 40 outwardly against compression spring 43 until piston 40 is restrained from further movement by packing of spring 43 against annular abutment flange 42 or by contact of flange 42 by piston 40. This can provide pressure on grease within hub 12 in the order of 3 to 6 psi.

Lubricating fittings 66 follow conventional constructions, which, of course, include one-way or ball check valving.

To avoid difficulties such as forcing out inner seal 24, even with a hand powered gun, an over-pressurization device should be provided. I have devised an over-pressurization assembly that is both effective and economical, and also avoids galvanic action from abutment of dissimilar metals. An annular rib 72 is formed on the outer side of piston 40 concentric with bore 62. A circular spring metal disc 74 is provided with a central opening concentric with threaded shank 68. The annular margin of disc 74 laps and abuts annular rib 72 thereby effecting a seal. There are several pressure relief openings 76 through piston 40 in the area covered by disc 74, so that disc 74 has a pressure relief function, being overcome to relieve pressure in inner cavity 54 when sufficient pressure (i.e., about 3 to 6 psi) develops in inner cavity 54. Pressure relief openings 76 are concentric with bore 62 and are preferable evenly spaced and annularly elongated.

Piston 40 has a thin walled annular flange 78 outwardly extending around bore 62. Fitting 66 by force of nut 70 turns flange 78 to secure disc 74 with thin walled flange 78 spacing disc 74 from fitting 66 to prevent galvanic action therebetween.

Outer annular flange 60 has its annular wall surface 80 adjacent to barrel 28 contrasting in appearance to barrel 28 so that how far piston 40 extends outwardly relative to flange 28 of barrel 40 can be readily observed by a user to estimate how much pressurized grease (if any) is on the inner side of piston 40. Annular wall surface 80 in the absence of pressurized grease is withdrawn substantially inside barrel 28. Annular wall surface 80 in the presence of pressurized grease compressing compression spring 43 extends outwardly relative to the plane 82 of the end barrel 28 distances corresponding to the degree of compression of compression spring 43. Annular wall surface 80 is immediately adjacent to the flange 42 of barrel 28, so the users eye will judge the position of annular wall surface 80 by relating it to the plane 82 of the end of barrel 28, that is the plane of the inturned flange 42. Calibrations can be placed on annular wall surface 80 to index extension of piston 40 to barrel end plane 82.

At present the preferred contrasting condition of annular wall surface 80 is to have something like a Royal Blue color which will contrast with barrel 28 both in color contrast (blue color verses the silver color) and in lightness/ darkness (value) contrast (dark plastic value verses light/ silver value). In this way, the degree of pressure extension of piston 40 is easily observed and judged by trailer owners and users. Annular wall surface 80 is immediately adjacent to inturned flange end 42 of barrel 28, so the plane 82 of the end of the barrel makes a ready optical reference plane in judging the extension of piston 40.

Whether grease has been expelled past disc 74 into outer piston cavity 58 can be observed by looking in cavity 58 provided dust cap 84 is removed. Cap 84 preferably is made of stainless steel and an annular bead 86 on cap 84 snaps into an annular groove 88 at the end of piston 40 to secure cap 84 in place. Cap 84 is put in place during use of the trailer and keeps out sand, dirt, and other contaminants from entering cavity 58. Cap 84 also prevents grease in outer cavity 58 from being flung onto trailer wheels due to centrifugal force.

In a prior art grease pressurized hub presently being marketed, the instructions for checking grease pressurization is as follows:

"Check the hub lubricant level by pressing on the edge of the spring loaded piston. If you can move or rock the piston, the hub has sufficient grease. Don't add any more! This simple check instantly tells you that the hub is full of grease.

"If the piston cannot be moved, it's time to add grease. Add only enough to move the piston outward approximately ⅛"."

It will be understood how much more satisfactory my system of judging grease sufficiency is and particularly if the piston being tested in the above procedure were hot, grease coated, or dirty.

Having thus described my invention, I do not wish to be understood as limiting myself to the exact details described, but instead wish to cover those modifications thereof that will occur to those skilled in this art upon examining my disclosure and which are properly within the scope of the following claims.

I claim:

1. A grease pressurizing hubcap for a wheel hub, comprising:
    (a) a generally cylindrical stainless steel barrel open at inner and outer ends, said inner end being press fitted into said wheel hub,
    (b) said barrel being inturned at said outer end forming an internal flange providing an outer abutment,
    (c) said barrel being annularly formed near said inner end to form an external annular rib limiting entry into said wheel hub and to form an internal annular groove, and a stainless steel wire split ring of polygon configuration secured in said annular groove and forming an inner abutment, (d) a plastic piston disposed in said barrel and limited in inward movement by said inner abutment, said piston having a full diameter portion slidable axially of said barrel and an O-ring seal in said full diameter portion sealing against the inner surface of said barrel, (e) said piston having a reduced diameter outer end portion and a stainless steel compression spring disposed in said reduced diameter portion and bearing on said outer abutment normally pressing said piston to an inner position, (f) said piston having an outer central cavity at its outer end forming an outer annular flange of diameter close to the inside diameter of said internal flange and said piston having an inner central cavity at its inner end forming an inner annular flange, said outer cavity providing a receptacle to receive grease in over-pressurization conditions and said inner cavity providing a receptacle for grease open to said wheel hub, a central bore in said piston and a hexagonal recess at the inner end of said bore and a zinc plated steel lubricating fitting disposed in said outer cavity and having a threaded shank disposed in said bore and a zinc plated steel nut on said shank disposed in said hexagonal recess, whereby grease under pressure can be applied through said fitting to fill said wheel hub and to press said piston outwardly until said piston strikes said outer abutment so that pressure on grease in said inner cavity will be maintained by said compression spring, (g) said piston having a plurality of pressure relief openings spaced around said bore and extending between said cavities, said piston having an annular plastic rib in said outer cavity concentric to said bore and facing outwardly and a thin circular spring steel disc having a central bore through which said shank extends, said disc having an annular margin lapping and abutting said annular plastic rib thereby sealing said pressure relief openings and giving upon over-pressurization, said piston having a thin walled annular flange outwardly extending around said bore and said fitting by force of said nut on said threaded shank turning said thin walled flange outwardly during initial assembly to secure said disc with said thin walled flange spacing said disc from said fitting to prevent galvanic action therebetween, (h) said outer annular flange of said piston having its walls adjacent to said barrel contrasting in appearance to said barrel so that how far said piston extends outwardly relative to said flange of said barrel can be readily observed by a user to estimate how much pressurized grease is in said inner cavity, said outer annular flange in the absence of pressurized grease being withdrawn substantially inside said barrel and said outer annular flange in the presence of pressurized grease compressing said compression spring extending outwardly of said barrel distances corresponding to the degree of grease pressurization and to the degree of compression of said compression spring, and (i) a dust cap at the outer end of said piston covering said outer cavity.

2. A grease pressurizing hubcap for a wheel hub, comprising:

(a) a generally cylindrical barrel open at inner and outer ends, said inner end being press fitted into said wheel hub, (b) said barrel being inturned at said outer end forming an internal flange providing an outer abutment, (c) said barrel being annularly formed near said inner end to form an external annular rib limiting entry into said wheel hub and to form an internal annular groove, and a wire split ring secured in said annular groove and forming an inner abutment, (d) a piston disposed in said barrel and limited in inward movement by said inner abutment, said piston having a full diameter portion slidable axially of said barrel and an O-ring seal in said full diameter portion sealing against the inner surface of said barrel, (e) said piston having a reduced diameter outer end portion and a compression spring disposed in said reduced diameter portion and bearing on said outer abutment normally pressing said piston to an inner position, (f) said piston having an outer central cavity at its outer end forming an outer annular flange of diameter close to the inside diameter of said internal flange and an inner cavity in said barrel at the inner end of said piston, said outer cavity providing a receptacle to receive grease in over-pressurization conditions and said inner cavity providing a receptacle for grease open to said wheel hub, a bore in said piston and a lubricating fitting disposed in said outer cavity having a shank secured in said bore, whereby grease under pressure can be applied through said fitting to fill said wheel hub and to press said piston outwardly until said piston strikes said outer abutment so that pressure on grease in said inner cavity will be maintained by said compression spring, (g) said piston having pressure relief opening means extending between said cavities and a circular spring disc having a central bore through which said shank extends, said disc lapping and abutting said pressure relief opening means thereby sealing said pressure relief opening means and giving upon over-pressurization, and (h) said outer annular flange of said piston having its walls adjacent to said barrel contrasting in appearance to said barrel so that how far said piston extends outwardly relative to said flange of said barrel can be readily observed by a user gaging piston extension beyond the plane of said outer end of said barrel, to estimate how much pressurized grease is in said inner cavity, said outer annular flange in the absence of pressurized grease being withdrawn relative to said barrel and said outer annular flange in the presence of pressurized grease compressing said compression spring extending outwardly of said barrel substantial distances corresponding to the degree of grease pressurization and to the degree of compression of said compression spring.

3. A grease pressurizing hubcap for a wheel hub, comprising:

(a) a metal barrel open at inner and outer ends, said inner end being secured to said wheel hub, (b) the metal of the outer end of said barrel being inturned to form an annular flange which provides an outer annular abutment, (c) a piston slidably mounted in said barrel and sliding past said annular flange proximate thereto and a seal between said barrel and said piston, (d) a compression spring between said piston and said outer abutment and normally pressing said piston to an inner position, (e) said piston having an outer central cavity at its outer end formed by an outer annular flange at the outer end of said piston having an exterior diameter close to the inside diameter of said annular flange of said barrel, and an inner cavity in said barrel at the inner end of said piston, providing a receptacle for grease open to said wheel hub, a bore in said piston and a lubricating fitting disposed in said outer cavity and secured to said bore, whereby grease under pressure can be applied through said fitting to fill said wheel hub and to press said piston outwardly until said piston strikes said outer abutment so that pressure on grease in said inner cavity will be maintained by said compression spring, (f) said outer annular flange of said piston in the absence of pressurized grease being withdrawn relative to said barrel and said outer annular flange in the presence of pressurized grease compressing said compression spring extending substantial distances outwardly of said barrel corresponding to the degree of grease pressurization and to the degree of compression of said compression spring so as to be readily observed by a user gaging piston extension beyond the plane of said annular flange of said barrel, and (g) said bore being centrally located in said piston and having a hexagonal recess at its inner end, said lubricating fitting having a threaded shank disposed in said bore and a nut on said shank disposed in said hexagonal recess, said piston having pressure relief opening means therethrough, a thin circular spring steel disc having a central bore through which said shank extends, said disc having an annular margin lapping said pressure relief opening means thereby sealing said pressure relief opening means and giving upon over-pressurization.

4. The hubcap of claim 3 in which said pressure relief opening means includes several openings evenly spaced around said bore, said piston having an annular rib in said outer central cavity concentric to said bore and facing outwardly and said disc sealing against said annular rib of said piston.

5. The hubcap of claim 3 in which said barrel is stainless steel and said lubricating fitting is zinc plated steel and said piston is formed of plastic, said piston having a thin walled annular flange outwardly extending around said bore and said fitting by force of said nut on said threaded shank turning said thin walled flange outwardly to secure said disc with said thin walled flange spacing said disc from said fitting to prevent galvanic action therebetween.

6. A grease pressurizing hubcap for a wheel hub, comprising:

(a) a stainless steel barrel open at inner and outer ends, said inner end being secured to said wheel hub, (b) said barrel having thin walls of uniform thickness, the metal of the outer end of said barrel being shaped into a thin-walled reverse interior bend forming an annular flange which provides an outer annular abutment, (c) a plastic hydraulic piston slidably mounted in said barrel and having a full diameter portion and having reduced diameter outer end portion sliding past said annular flange of said barrel proximate thereto and an O-ring seal between said barrel and said full diameter portion of said piston, (d) a compression spring between said piston and said outer abutment and normally pressing said piston to an inner position and disposed in said reduced diameter portion of said piston, (e) said piston having an outer central cavity at its outer end formed by an outer annular flange at the outer end of said piston having an exterior diameter close to the inside diameter of said annular flange of said barrel, said piston having a bore and lubricating fitting disposed in said outer cavity and secured to said bore, whereby grease under pressure can be applied through said fitting to fill said wheel hub and to press said piston outwardly until said piston is restrained by said outer abutment so that pressure on grease in said barrel will be maintained by said compression spring, and (f) said outer annular flange of said piston in the absence of pressurized grease being withdrawn relative to said barrel and said outer annular flange in the presence of pressurized grease compressing said compression spring and extending substantial distances outwardly of said barrel corresponding to the degree of grease pressurization and to the degree of compression of said compression spring so as to be readily observed by a user gaging piston extension beyond the plane of said annular flange of said barrel.

7. A grease pressurizing hubcap for a wheel hub, comprising:

(a) a metal barrel open at inner and outer ends, said inner end being secured to said wheel hub, (b) the metal of the outer end of said barrel being shaped into an interior bend to form an annular flange which provides as outer annular abutment, (c) a hydraulic piston slidably mounted in said barrel and having a full diameter portion and having a reduced diameter outer end portion sliding past said annular flange of said barrel proximate thereto and a seal between said barrel and said full diameter portion of said piston, (d) a compression spring between said piston and said outer abutment and normally pressing said piston to an inner position and disposed in said reduced diameter portion of said piston, (e) said piston having an outer central cavity at its outer end formed by an outer annular flange at the outer end of said piston having an exterior diameter close to the inside diameter of said annular flange of said barrel, said piston having a bore and a metal lubricating fitting disposed in said outer cavity and secured to said bore, whereby grease under pressure can be applied through said fitting to fill said wheel hub and to press said piston outwardly until said piston is restrained by said outer abutment so that pressure on grease in said barrel will be maintained by said compression spring, (f) said outer annular flange of said piston in the absence of pressurized grease being withdrawn relative to said barrel and said outer annular flange in the presence of pressurized grease compressing said compression spring and extending substantial distances outwardly of said barrel corresponding to the degree of grease pressurization and to the degree of compression of said compression spring so as to be readily observed by a user gaging piston extension beyond the plane of said annular flange of said barrel, and
(g) said piston having pressure relief opening means therethrough, said lubricating fitting having a threaded shank fitting in said bore and a nut on said shank, a thin circular spring steel disc having a central bore through which shank extends, said disc having an annular margin lapping said pressure relief opening means thereby sealing said pressure relief opening means and giving upon over-pressurization, said piston being formed of plastic and said piston having a thin-walled annular flange outwardly extending around said bore and said fitting by force of said nut on said threaded shank turning said thin-walled flange outwardly to secure said disc with said thin-walled flange spacing said disc from said fitting to prevent galvanic action therebetween.

8. A grease pressurizing hubcap for a wheel hub, comprising:
(a) a metal barrel open at inner and outer ends, said inner end being secured to said wheel hub,
(b) the metal of the outer end of said barrel being shaped into an interior bend to form an annular flange which provides an outer annular abutment,
(c) a hydraulic piston slidably mounted in said barrel and having a full diameter portion and having a reduced diameter outer end portion sliding past said annular flange of said barrel proximate thereto and a seal between said barrel and said full diameter portion of said piston,
(d) a compression spring between said piston and said outer abutment and normally pressing said piston to an inner position and disposed in said reduced diameter portion of said piston,
(e) said piston having an outer central cavity at its outer end formed by an outer annular flange at the outer end of said piston having an exterior diameter close to the inside diameter of said annular flange of said barrel, said piston having a bore and a lubricating fitting disposed in said outer cavity and secured to said bore, whereby grease under pressure can be applied through said fitting to fill said wheel hub and to press said piston outwardly until said piston is restrained by said outer abutment so that pressure on grease in said barrel will be maintained by said compression spring,
(f) said outer annular flange of said piston in the absence of pressurized grease being withdrawn relative to said barrel and said outer annular flange in the presence of pressurized grease compressing said compression spring and extending substantial distances outwardly of said barrel corresponding to the degree of grease pressurization and to the degree of compression of said compression spring so as to be readily observed by a user gaging piston extension beyond the plane of said annular flange of said barrel, and
(g) said piston having pressure relief opening means therethrough, said lubricating fitting having a shank fitting in said bore, a thin circular spring steel disc having a central bore through which said shank extends, said disc having an annular margin lapping said pressure relief opening means thereby sealing said pressure relief opening means and giving upon over-pressurization.

9. A grease pressurizing hubcap for a wheel hub, comprising:
(a) a thin-walled metal barrel open at inner and outer ends, said inner end being secured to said wheel hub,
(b) the metal of the outer end of said barrel being shaped into a thin-walled interior bend forming an annular flange which provides an outer annular abutment,
(c) a hydraulic piston slidably mounted in said barrel and sliding past said annular flange of said barrel proximate thereto and a seal between said barrel and said piston,
(d) a compression spring between said piston and said outer abutment and normally pressing said piston to an inner position,
(e) said piston having an outer central cavity at its outer end formed by an outer annular flange at the outer end of said piston having an exterior diameter close to the inside diameter of said annular flange of said barrel, a bore in said piston and a lubricating fitting disposed in said outer cavity and secured to said bore, whereby grease under pressure can be applied through said fitting to fill said wheel hub and to press said piston outwardly until said piston is restrained by said outer abutment so that pressure on grease in said barrel will be maintained by said compression spring,
(f) said outer annular flange of said piston in the absence of pressurized grease being withdrawn relative to said barrel and said outer annular flange in the presence of pressurized grease compressing said compression spring and extending substantial distances outwardly of said barrel corresponding to the degree of grease pressurization and to the degree of compression of said compression spring so as to be readily observed by a user gaging piston extension beyond the plane of said annular flange of said barrel, and
(g) a solid removable cap installed at the outer end of said outer annular flange of said piston completely sealing said outer central cavity and said piston having over-pressurization relief means expelling excess grease into said outer central cavity and said cap preventing escape of said excess grease from said outer central cavity and preventing contaminants from entering said outer central cavity from the outside.

10. A grease pressurizing hubcap for a wheel hub, comprising:
(a) a stainless steel thin-walled metal barrel open at inner and outer ends, said inner end being secured to said wheel hub,
(b) the metal of the outer end of said barrel being shaped into a thin-walled interior bend forming an annular flange which provides an outer annular abutment,
(c) a hydraulic piston slidably mounted in said barrel and sliding past said annular flange of said barrel proximate thereto and a seal between said barrel and said piston,
(d) a compression spring between said piston and said outer abutment and normally pressing said piston to an inner position,
(e) said piston having an outer central cavity at its outer end formed by an outer annular flange at the outer end of said piston having an exterior diameter close to the inside diameter of said annular flange of said barrel, a bore in said piston and a lubricating fitting disposed in said outer cavity and secured to said bore, whereby grease under pressure can be applied through said fitting to fill said wheel hub and to press said piston outwardly until said piston is restrained by said outer abutments so that pressure on grease in said barrel will be maintained by said compression spring, (f) said outer annular flange of said piston in the absence of pressurized grease being withdrawn relative to said barrel and said outer annular flange in the presence of pressurized grease compressing said compression spring and extending substantial distances outwardly of said barrel corresponding to the degree of grease pressurization and to the degree of compression of said compression spring so as to be readily observed by a user gaging piston extension beyond the plane of said annular flange of said barrel, and (g) said barrel near its inner end having an annular convolute forming both an annular groove in its interior surface and an aligned annular rib on its exterior surface, said annular rib limiting entry of said barrel into said wheel hub, and a ring secured in said annular groove and forming an inner abutment limiting inward movement of said piston.

11. A grease pressurizing hubcap for a wheel hub, comprising:

(a) a metal barrel open at inner and outer ends, said inner end being secured to said wheel hub, (b) the metal of the outer end of said barrel being shaped into an interior bend to form an annular flange which provides an outer annular abutment, (c) a hydraulic piston slidably mounted in said barrel and having a full diameter portion and having a reduced diameter outer end portion sliding past said annular flange of said barrel proximate thereto and a seal between said barrel and said full diameter portion of said piston, (d) a compression spring between said piston and said outer abutment and normally pressing said piston to an inner position an disposed in said reduced diameter portion of said piston, (e) said piston having an outer central cavity at its outer end formed by an outer annular flange at the outer end of said piston having an exterior diameter close to the inside diameter of said annular flange of said barrel, said piston having a bore and a lubricating fitting disposed in said outer cavity and secured to said bore, whereby grease under pressure can be applied through said fitting to fill said wheel hub and to press said piston outwardly until said piston is restrained by said outer abutment so that pressure on grease in said barrel will be maintained by said compression spring, (f) said outer annular flange of said piston in the absence of pressurized grease being withdrawn relative to said barrel and said outer annular flange in the presence of pressurized grease compressing said compression spring and extending substantial distances outwardly of said barrel corresponding to the degree of grease pressurization and to the degree of compression of said compression spring so as to be readily observed by a user gaging piston extension beyond the plane of said annular flange of said barrel, and (g) said piston having pressure relief opening means therethrough and a valve controlling pressure relief through said opening means and a valve spring normally pressing the valve to a closed position and said valve spring being overcome to relieve pressure upon grease pressure in said barrel reaching a selected level.

* * * * *